(12) United States Patent
Koren et al.

(10) Patent No.: US 8,745,598 B2
(45) Date of Patent: Jun. 3, 2014

(54) RUNNING INJECTED CODE PRIOR TO EXECUTION OF AN APPLICATION

(75) Inventors: Eyal Koren, Kibbuta (IL); Golan Hallel, Maayan Baruch (IL); Asaf Dafner, Gedera (IL)

(73) Assignee: BMC Software, Inc., Houston, TX (US)

( * ) Notice: Subject to any disclaimer, the term of this patent is extended or adjusted under 35 U.S.C. 154(b) by 767 days.

(21) Appl. No.: 12/967,211

(22) Filed: Dec. 14, 2010

(65) Prior Publication Data

US 2012/0151464 A1 Jun. 14, 2012

(51) Int. Cl.
*G06F 9/44* (2006.01)
(52) U.S. Cl.
USPC .......................... 717/130; 717/118; 717/166
(58) Field of Classification Search
None
See application file for complete search history.

(56) References Cited

U.S. PATENT DOCUMENTS

| | | | |
|---|---|---|---|
| 4,598,364 A | 7/1986 | Gum et al. | |
| 5,121,489 A | 6/1992 | Andrews | |
| 5,193,180 A | 3/1993 | Hastings | |
| 5,335,344 A | 8/1994 | Hastings | |
| 5,410,685 A | 4/1995 | Banda et al. | |
| 5,446,876 A | 8/1995 | Levine et al. | |
| 5,465,258 A | 11/1995 | Adams | |
| 5,481,740 A | 1/1996 | Kodosky | |
| 5,513,317 A | 4/1996 | Borchardt et al. | |
| 5,526,485 A | 6/1996 | Brodsky | |
| 5,590,354 A | 12/1996 | Klapproth et al. | |
| 5,632,032 A | 5/1997 | Ault et al. | |
| 5,740,355 A | 4/1998 | Watanabe et al. | |
| 5,848,274 A | 12/1998 | Hamby et al. | |
| 5,870,606 A | 2/1999 | Lindsey | |
| 5,928,369 A | 7/1999 | Keyser et al. | |
| 5,938,778 A | 8/1999 | John, Jr. et al. | |
| 5,940,618 A | 8/1999 | Blandy et al. | |
| 5,983,366 A | 11/1999 | King | |
| 6,003,143 A | 12/1999 | Kim et al. | |
| 6,202,199 B1 | 3/2001 | Wygodny et al. | |
| 6,282,701 B1 | 8/2001 | Wygodny et al. | |
| 6,321,375 B1 | 11/2001 | Blandy | |
| 6,374,369 B1 | 4/2002 | O'Donnell | |
| 6,467,052 B1 | 10/2002 | Kaler et al. | |
| 7,058,928 B2 | 6/2006 | Wygodny et al. | |
| 7,293,259 B1 * | 11/2007 | Dmitriev ....................... | 717/130 |
| 7,386,839 B1 | 6/2008 | Golender et al. | |

(Continued)

FOREIGN PATENT DOCUMENTS

WO WO9605556 A1 2/1996

OTHER PUBLICATIONS

Berdajs et al., "Extending Applications Using an Advanced Approach to DLL injection and API hooking", 2010 John Wiley & Sons, Ltd., pp. 567-584; <http://onlinelibrary.wiley.com/doi/10.1002/spe.973/abstract>.*

(Continued)

*Primary Examiner* — Thuy Dao
*Assistant Examiner* — Ben C Wang (57) ABSTRACT

A technique provides a hook that executes prior to a software application that is invisible to the software application. In an object-oriented execution environment, an imposter main class is loaded instead of the application main class. The imposter main class then manipulates the object-oriented execution environment to load the application main class without requiring knowledge of the application main class other than its name, and without requiring a change to the command line for the application.

19 Claims, 5 Drawing Sheets

(56) References Cited

U.S. PATENT DOCUMENTS

| | | | |
|---|---|---|---|
| 7,665,080 B2* | 2/2010 | Spotwood | 717/166 |
| 7,818,721 B2* | 10/2010 | Sundararajan et al. | 717/130 |
| 7,836,438 B1* | 11/2010 | Nikolov | 717/118 |
| 7,895,580 B1* | 2/2011 | Nikolov | 717/118 |
| 7,962,905 B2* | 6/2011 | Inamdar | 717/118 |
| 8,132,150 B2* | 3/2012 | De Sutter et al. | 717/130 |
| 8,276,125 B2* | 9/2012 | Fan et al. | 717/118 |
| 8,397,227 B2* | 3/2013 | Fan et al. | 717/166 |
| 2002/0147971 A1* | 10/2002 | Adams | 717/165 |
| 2003/0005414 A1 | 1/2003 | Elliott et al. | |
| 2003/0145309 A1* | 7/2003 | Inamdar | 717/118 |
| 2003/0149960 A1* | 8/2003 | Inamdar | 717/118 |
| 2004/0153996 A1* | 8/2004 | Boykin et al. | 717/118 |
| 2007/0169000 A1* | 7/2007 | Havin et al. | 717/130 |
| 2007/0169041 A1* | 7/2007 | Kojima et al. | 717/148 |
| 2007/0169055 A1* | 7/2007 | Greifeneder | 717/130 |
| 2007/0198475 A1* | 8/2007 | Meduri et al. | 707/3 |
| 2007/0220495 A1* | 9/2007 | Chen et al. | 717/130 |
| 2008/0109794 A1* | 5/2008 | Adams et al. | 717/130 |
| 2008/0276227 A1* | 11/2008 | Greifeneder | 717/130 |
| 2009/0089749 A1* | 4/2009 | Day et al. | 717/118 |
| 2009/0125881 A1* | 5/2009 | Susarla et al. | 717/110 |
| 2009/0144714 A1* | 6/2009 | Fan et al. | 717/166 |
| 2009/0144751 A1* | 6/2009 | Fan et al. | 719/315 |
| 2010/0115495 A1* | 5/2010 | Sunkara et al. | 717/130 |
| 2011/0107307 A1* | 5/2011 | Liu et al. | 717/130 |
| 2011/0283263 A1* | 11/2011 | Gagliardi et al. | 717/130 |
| 2011/0283264 A1* | 11/2011 | Gagliardi | 717/130 |
| 2011/0283265 A1* | 11/2011 | Gagliardi et al. | 717/130 |
| 2012/0192004 A1* | 7/2012 | Findeisen | 717/130 |
| 2013/0152064 A1* | 6/2013 | Gagliardi | 717/166 |
| 2013/0179868 A1* | 7/2013 | Greifeneder et al. | 717/130 |

OTHER PUBLICATIONS

Kniesel et al., "JMangler—A Framework for Load-Time Transformation of Java Class Files", 2001 IEEE, SCAM 2001, pp. 98-108; <http://ieeexplore.ieee.org/stamp/stamp.jsp?tp=&arnumber=972671>.*

Factor et al., "Instrumentation of Standard Libraries in OOL—the Twin Class Hierarchy Approach", 2004 ACM, OOPSLA'04, Oct. 24-28, 2004, Vancouver, British Columbia, Canada, pp. 288-300; <http://dl.acm.org/results.cfm?h=1&cfid=283423755&cftoken=42010227>.*

Abramson et al. "A Debugging Tool for Software Evolution", CASE-95, 7th International Workshop on Computer-Aided Software Engineering, Jul. 1995.

BMC Software, Inc. "BMC AppSight Application Problem Resolution System, Optimizing Application Development Processes Throughout the Application Lifecycle," 8 pages, 2006.

BMC Software, Inc. "BMC AppSight Application Problem Resolution System for J2EE With Black Box Software Technology," 2 pages, 2006.

Bruegge, Bernd et al. "A Framework for Dynamic Program Analyzers," Conference on Object-Oriented Programming Systems, Languages, and Applications (OOSLA'93), Washington, pp. 65-82, Sep. 1993.

Larus, James R. "Efficient Program Tracing," IEEE Software magazine, May 1993, pp. 52-61.

Netzer, Robert H. B. et al. "Optimal Tracing and Replay for Debugging Message-Passing Parallel Programs," IEEE, pp. 502-511, 1992.

Netzer, Robert H. B. et al. "Optimal Tracing and Replay for Debugging Shared-Memory Parallel Programs," ACM/ONR Workshop on Parallel and Distributed Debugging, May 1993.

Netzer, Robert H. B., et al. "Optimal Tracing and Incremental Reexecution for Debugging Long-Running Programs," ACM SIGPLAN Conference on Programming Language Design and Implementation, Jun. 1994.

Plattner, Bernhard, et al. "Monitoring Program Execution: A Survey," IEEE Computer, pp. 76-93, Nov. 1981.

Schieber, Colleen D., et al. "RATCHET: Real-time Address Trace Compression Hardware for Extended Traces," Performance Evaluation Review vol. 21 #3 and 4, Apr. 1994.

Spinellis, Diomidis. "Trace: A Tool for Logging Operating System Call Transactions," Operating Systems Review, vol. 28, No. 4, pp. 56-63, Oct. 1994.

Timmerman et al. "High Level Tools for the Debugging of Real-Time Multiprocessor Systems," IEEE, pp. 140-146, 1993.

Tsai, Jeffrey J.P., et al. "A Noninvasive Architecture to Monitor Real-Time Distributed Systems," IEEE Software, pp. 11-23, Mar. 1990.

* cited by examiner

RUNNING INJECTED CODE PRIOR TO EXECUTION OF AN APPLICATION

BACKGROUND

This disclosure relates generally to the field of computer software. More particularly, but not by way of limitation, it relates to a technique for injecting code into an application to be run prior to execution of the application.

Software products that monitor software applications at runtime often need to execute code before the actual application starts to execute. The primary reason is enabling instrumentation of the application's code, but other pre-application processes may also be required. A technique that enables running code prior to software application code is often referred to as "hooking" or "placing a hook."

JAVA® software applications (JAVA is a registered trademark of Oracle America, Inc.) are required by the JAVA Virtual Machine (JVM) specifications to provide an entry point, which is a class that declares and implements the method "public static void main(String args[ ])." This class is typically known as the "Main Class." Its fully qualified name is provided to the JVM executable (e.g., java.exe) as a command line argument. Consequently, the JVM, which provides an object-oriented environment for JAVA programs, looks up a class file that contains the Main Class's bytecode, loads it and runs its "main( )" method, thus starting the application. Normally, the Main Class class-file will be located in the "application classpath"—a JVM variable that specifies locations on the disk where user-defined resources are located.

One hooking technology that has been used is placing a new "Imposter Main Class" with the same fully qualified name as the actual application's Main class (referred here as the "Original Main Class") in one of the directories specified for the classpath. As a result, imposter Main class will execute first, delegating execution to the original Main class only after running its own hook code.

Class loading is the process of obtaining class bytes and transforming them into a "viable" entity in the JVM. This process is done by subclasses of java.lang.ClassLoader. According to what is known as the "class loading delegation model," a ClassLoader in the JVM will first ask its parent ClassLoader (if such exists) to load the requested class before trying to load itself. This procedure is recursive, which means that a class will be loaded in the highest possible point in the ClassLoader hierarchy.

"AppClassLoader" is the JVM ClassLoader "familiar" with the application classpath. Accordingly, it is the one requested to load the Main class. In compliance with the class loading delegation model, it delegates the request to its parent—"ExtClassLoader." The latter is another JVM-internal ClassLoader of which classpath is composed of all Java ARchive (jar) files located in all directories specified by the JVM argument "java.ext.dirs." Only after ExtClassLoader fails to load the Main class (since it is, normally, not part of its classpath) does the AppClassLoader loads the Main class itself.

There are problems with the "naïve" Main class replacement described above. These problems include (a) problems with loading the original Main class, (b) problems with classes accessed by the original Main class, (c) problems accessing members (methods and fields) of the original Main class, and (d) problems with different Main classes in different processes.

Due to the delegation model described above, the original Main class cannot be loaded in a conventional way (i.e., by invocation of any loadClass( ) overload), because that will return the formerly loaded Imposter Main class. Instead, the original Main class's bytes are typically obtained and the class is explicitly defined via a defineClass( ) method. Since the process of loading the first Main (i.e., the Imposter Main class) is initiated using AppClassLoader, AppClassLoader is recorded in the JVM as the initiating loader of the Main class, although the defining loader is actually ExtClassLoader. Trying to use AppClassLoader for defining the original Main class typically causes a problem in the JVM during the linkage process and a LinkageError is thrown as a result. That is why the Original Main is typically loaded using a new ClassLoader especially allocated for that purpose. That causes another problem, as the original ClassLoader hierarchy is completely altered.

All classes and class-members with package-private access that are accessed by the Original Main class (e.g., the Original Main class's inner classes) must be loaded by the same ClassLoader that loaded the Original Main class. Otherwise, the two classes will not be seen in the same runtime package (which is defined by the package name and the defining loader) causing an IllegalAccessError. This means that all of those classes and class-members must be known in advance.

All Original Main class members (methods and fields), even public ones, are not accessible to the rest of the application—any request for the Original Main class will yield the Imposter Main class (again, due to the delegation model). This can be worked around for methods by holding a reference to the Original Main class in the Imposter Main class, overloading required methods and delegating execution to the Original Main class. However, this means that the imposter Main class needs to be familiar with the Original Main class. There is no generic solution for the Original Main class's fields.

In many cases, different Main classes can be used in different processes running different parts of the same application's code. If a process invoked by a Main class that is not overridden by an Imposter Main class uses a Main class that is overridden by an Imposter Main class, the process typically receives the Imposter Main class instead of the Original Main class.

In addition to the class replacement technique described above, other techniques have been developed for injecting code into an application to run prior to the original Main class.

In one conventional technique, the command line is changed to run a different Main class. The new Main class then executes hook code and then runs the "real" application's Main class. In this technique, instead of transferring the Main class name to the executable as a JVM parameter, it is transferred as a program parameter to the Main class that performs the hook.

In another conventional technique, a JAVA Agent is employed to run code prior to any class loading. This JVM inherent hooking mechanism is not available in all versions of the JAVA development kit (JDK), and requires modifying the command line that runs the JAVA executable.

Some JVMs expose a JVM Profiler Interface (JVMPI), intended for vendors to develop profilers that work in conjunction with that JVM. Using this application-programming interface (API) requires specifying the name of the profiler agent and the options to the profiler agent through a command line option to the JVM. Using this API opens a window in which to execute code, not necessarily written in the JAVA language, prior to application execution.

These techniques require editing the command line for the application, which can be a very limiting restriction for products that are designed for use in unknown and extremely variable environments. For example, in order to place the hook, one needs to know where all scripts are that run the application and edit them correctly. The hook will not be active when running any script that was formed after the hook was installed. In production environments, changing the command line may require privileges that may be highly restricted and unavailable for normal users. In addition, modifying the command line may be impossible to perform when the JAVA environment is invoked by binary code such as an .exe file. Finally, a user may choose to run the application explicitly from the command line, avoiding the hook usage.

Thus, a better technique for hooking application to provide code to run prior to execution of the Main class has been desired.

SUMMARY

In one embodiment, a method is disclosed. The method comprises loading a first class in an object-oriented environment executing on a computer, manipulating the object-oriented environment by a method of the first class, and executing a method of the second class on the computer in the object-oriented environment. The act of manipulating the object-oriented environment by a method of the first class comprises loading a second class in the object-oriented environment and making the first class invisible to the second class.

In another embodiment, a computer readable medium is disclosed. The computer readable medium has instructions for a programmable control device stored thereon wherein the instructions cause a programmable control device to perform the method described above.

In yet another embodiment, a networked computer system is disclosed. The networked computer system comprises a first computer system and a second computer system, communicatively coupled to the first computer system. The first computer system comprises a first processor, a first software, which when executed causes the creation of an object-oriented environment on the first processor, and a second software, which when executed causes the object-oriented environment to load a first class into the object-oriented environment. The first class comprises logic to manipulate the object-oriented environment to load a second class of the object-oriented environment and logic to make the first class invisible to the second class. The second computer system comprises a second processor and a storage subsystem on which is stored the first class.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The following description is at times written using terminology and examples using JAVA®, J2EE®, or J2SE® components or environments. (JAVA, J2EE, and J2SE are registered trademarks of Oracle America, Inc.) Nevertheless, the present invention is not limited to such components or environments, and may be embodied in other programming languages, components, or environments as desired.

Embodiments disclosed herein change the way Original Main class replacement is done, thus avoiding the problems described above, addresses the problem of placing hooks, and provides a significant improvement to the techniques known in the art for placing hooks.

The use of these hooks is outside the scope of this invention and should be considered irrelevant for this invention. However, for illustrative purposes a few examples of how hooks can be used in general are provided below.

Instrumentation Purposes:

This may be a rather complicated implementation, because a lot of the complexity is in the work that has to happen after hook was placed. However, using embodiments described herein for instrumentation purposes enables catching all application code.

Change Runtime Behavior:

A much simpler example would be one in which the user wants to perform a simple action, such as to print an image on the screen or send an email, before a given application starts running, without having to modify the application code. In this case, the hook code is executed once without influencing application execution.

It should be clear to the reader that these examples are only provided to highlight the value of this invention. The list of examples is therefore not conclusive.

The problems described above related to replacement of the Main class result from the alteration of the original Class-Loader hierarchy, and the duplicity of the Main class in that hierarchy, (i.e., having both the Original Main class and the Imposter Main class). Various embodiments solve these problems by creating a new, clean ClassLoader hierarchy after executing the desired hook code. In the new hierarchy, only one class file of the Main class exists, the original Main class. It is loaded in a conventional way by the ClassLoader that would have naturally loaded the original Main class.

Figure 1:
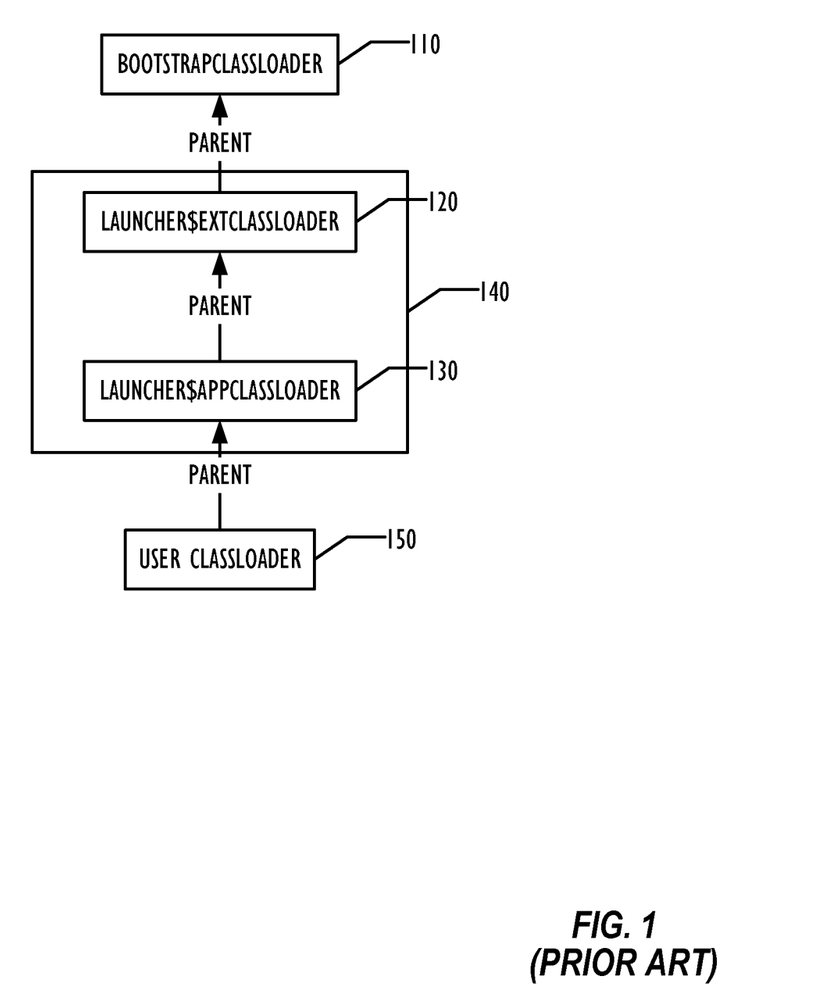
FIG. 1 illustrates, in graph form, an example of a Class-Loader hierarchy according to the prior art.

FIG. 1 is a graph illustrating the sun.misc.Launcher class 140 according the prior art. This is a JVM internal class, implemented very much like a singleton. It holds a single static instance reachable by a public static getter. Both the ExtClassLoader 120 and the AppClassLoader 130 are inner classes of the Launcher class 140. When the JVM starts up, the single Launcher 140 instance is created. During this process, one ExtClassLoader 120 instance and one AppClassLoader 130 instance are created as well, each getting its classpath. The ExtClassLoader 120 has its parent set to be the native JVM root BootstrapClassLoader 110 and the AppClassLoader 130 has its parent set to be the ExtClassLoader 120 instance. When the application is loaded, a user ClassLoader 150 has its parent set to the AppClassLoader 130, unless specified otherwise.

The classpaths for the ExtClassLoader 120 and the AppClassLoader 130 are maintained separately by the JVM. Typically, the classpath for the ExtClassLoader 120 is identified by a JVM system property java.ext.dirs, while the AppClassLoader 130 classpath is identified by a JVM system property java.class.path. Thus, a class accessible by the ExtClassLoader 120 may be inaccessible to the AppClassLoader 130. Multiple paths may be defined in the classpaths for the ExtClassLoader 120 and AppClassLoader 130. The classpaths are typically identified to the JVM by the JAVA command line or by other techniques provided by an operating system of the computer running the JVM. The JVM obtains the classpath information and stores it in the JVM system properties as described above.

In one embodiment, the imposter Main class may be stored in a directory tree location that is added to the ExtClassLoader 120 classpath (the ExtClassLoader 120 classpath is sometimes described as the extensions directories), but which is not added to the classpath of the AppClassLoader 130, while the original Main class is stored in a directory tree location only in the classpath of the AppClassLoader 130. Thus the original Main class may be inaccessible to the ExtClassLoader 120.

Figure 2:
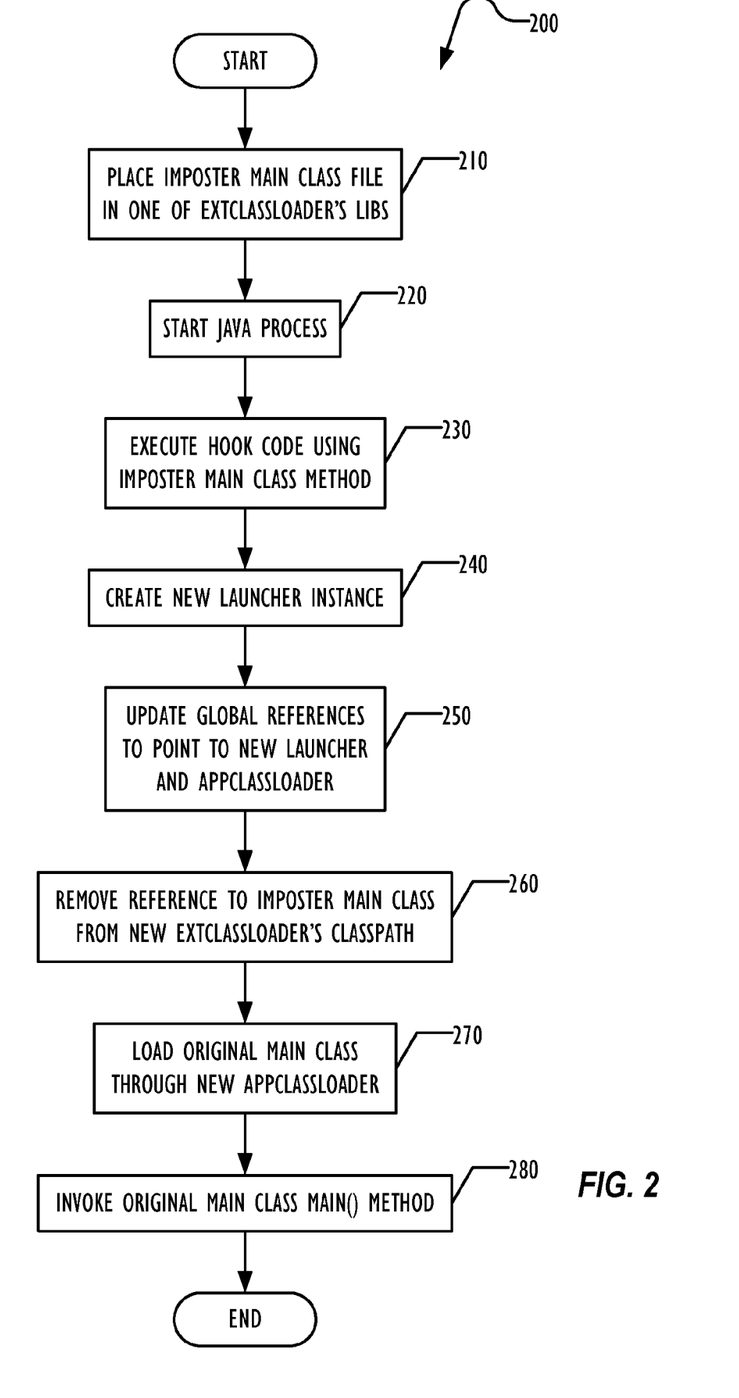
FIG. 2 illustrates, in flowchart form, an embodiment of a technique for injecting hooking code into an application according to one embodiment.

FIG. 2 is a flowchart illustrating a technique for hooking an application according to one embodiment. Before the JAVA process is started in the JVM, in block 210 the Imposter Main class file is placed in one of the libraries in the classpath of the Launcher 140's ExtClassLoader 120. The Imposter Main class has the same fully qualified name as the actual application's Main class. Then in block 220, the JAVA process is started, creating the instance of the Launcher 140, with its ExtClassLoader 120 and AppClassLoader 130, setting their parents as illustrated in FIG. 1.

The AppClassLoader 130 asks its parent ExtClassLoader 120 to load the Main class. Because the Imposter Main class is in the classpath of the ExtClassLoader 120, the Imposter Main class is loaded instead of the original Main class, allowing the main( ) method of the Imposter Main class to execute instead of the main( ) method of the original Main class.

In block 230, the hook code of the Imposter Main class is executed using the main( ) method of the Imposter Main class. This code may perform any desired actions, in addition to setting up the ClassLoader structures described below. In block 240, the hook code creates a new instance of the sun.misc.Launcher class 140.

In block 250, global references of the JVM are updated so that the JVM uses the ExtClassLoader 120 and the AppClassLoader of the new Launcher 140 when needing a ClassLoader. To avoid loading the Imposter Main class when attempting to load the original Main, the reference to the imposter Main class is removed from the classpath of the new ExtClassLoader 120 in block 260. The original Main class may then be loaded through the new AppClassLoader 130 in block 270, and the original Main class main method is invoked in block 280.

Thus, in one embodiment, the beginning of the hooking process is the same as in the simple Main class replacement described above: an Imposter Main is placed in a directory that is included in ExtClassLoader's classpath. Next, new ExtClassLoader 120 and AppClassLoader 130 instances are allocated, configured the same as the original instances. Then, using JAVA reflection technology, the Imposter Main class is excluded from the new ExtClassLoader's classpath. The final step of the process is loading the Original Main, using the new AppClassLoader 130 and invoking its main( ) method.

Figure 3:
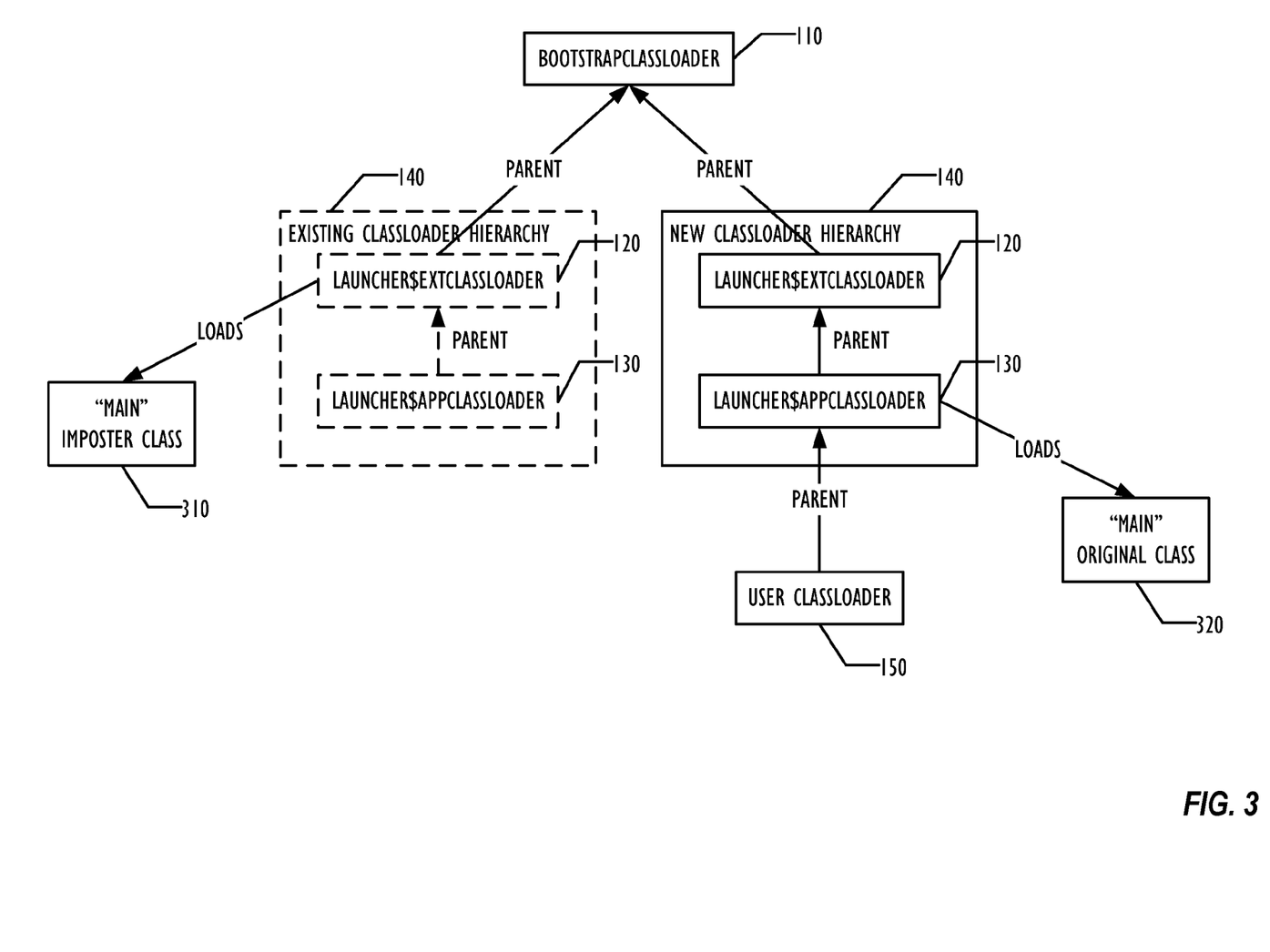
FIG. 3 illustrates, in graph form, an example collection of a ClassLoader tree after performance of the technique of FIG. 2.

FIG. 3 is a graph illustrating the relationships between Main classes and ClassLoader classes because of the technique illustrated in FIG. 2. Two Launcher instances 140 are created as described above. The existing ClassLoader hierarchy of ExtClassLoader 120 and AppClassLoader 130 is in the original Launcher 140, indicated in FIG. 3 with dashed lines. The new ClassLoader hierarchy of ExtClassLoader 120 and AppClassLoader 130 are in the new Launcher instance 140. Both the original ClassLoader hierarchy and the new ClassLoader hierarchy are linked so that the parent of the ExtClassLoader 120 in each Launcher 140 is the BootStrapClassLoader 110. Thus, the Imposter Main class 310 is loaded by the ExtClassLoader 120 of the original Launcher 140, while the original Main class 320 is loaded by the AppClassLoader 130 of the new Launcher 140.

References to the original Launcher 140 and its corresponding AppClassLoader 130 are held in global locations of the JVM, available everywhere in the application and that were initialized during JVM startup, before the hook code started running. The hook code changes those references to be references to the new Launcher 140 and its corresponding AppClassLoader 130, so that these will be the ones used when requested. In one embodiment, the references include a Launcher static field that references the Launcher instance 140 and the ClassLoader returned by the getter java.lang.ClassLoader.getSystemClassLoader( ). Using JAVA reflection technology, these references are reset to point at the new and valid instances.

In one embodiment, the original ClassLoader tree trunk illustrated in FIG. 3 is not used after the execution of the hook code, but remains alive in memory. However, the original Launcher instance 140 and its ExtClassLoader 120 and AppClassLoader 130 are all unreachable by the application code, thus making the hooking infrastructure of the imposter Main class 310 invisible to the application.

The actual hook code must be executed prior to Original Main class launching. Besides being used for direct execution of any trivial actions, this code can manipulate application execution in indirect (yet unlimited) ways by modifying the state of the JVM or manipulating the new ClassLoader tree trunk. For example, in one embodiment, a monitoring program uses this hook, among other things, to place the infrastructure that allows instrumentation of the entire application code.

Using the techniques described above avoids the need to edit the command line of the application and is not limited to specific JDKs. No trace of the hook code is visible to the application, and the hook code does not need to know anything about the Main class of the application other than its name.

In one embodiment, the JVM may allow the creating of new ExtClassLoader 120 and AppClassLoader 130 instances without creating a new instance of the Launcher 140.

Figure 4:
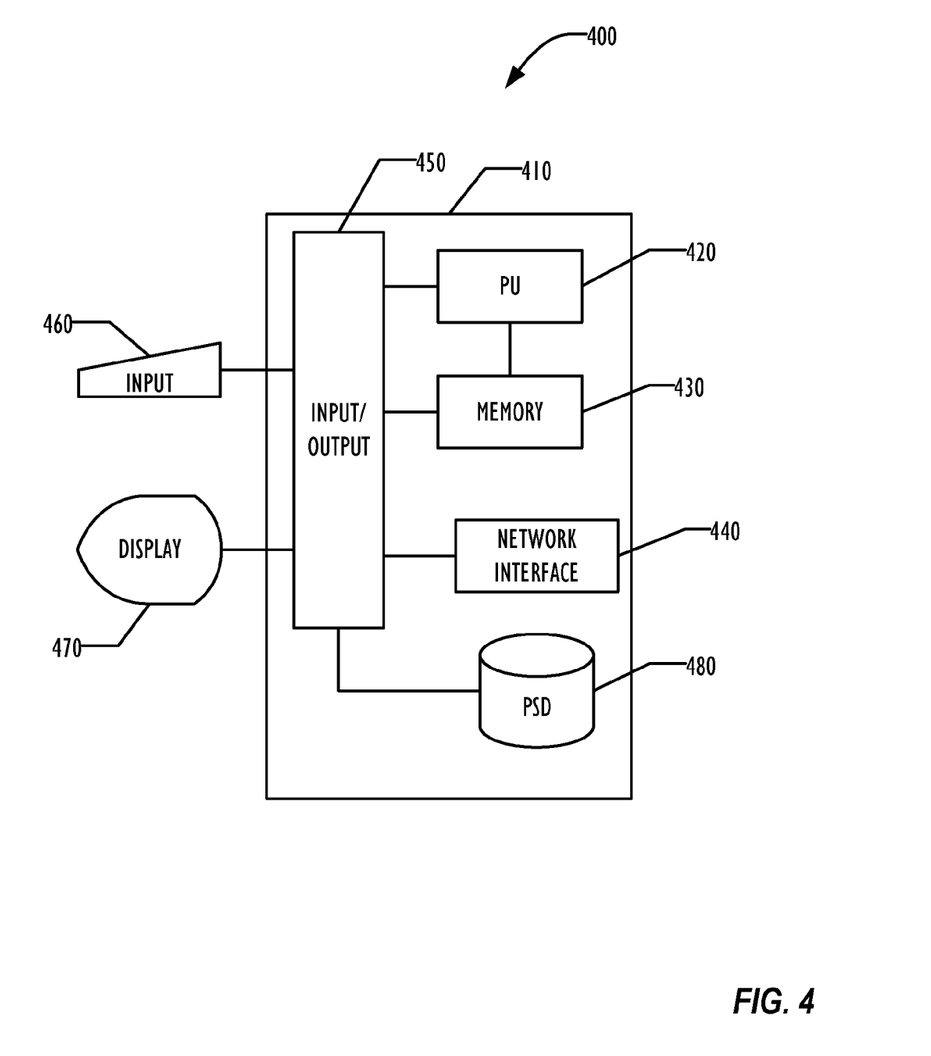
FIG. 4 illustrates, in block diagram form, an example computing device in which the techniques described above may execute according to one embodiment.

Referring now to FIG. 4, an example computer FIG. 400 for use in providing a hooking code is illustrated in block diagram form. Example computer FIG. 400 comprises a system unit FIG. 410 which may be optionally connected to an input device or system FIG. 460 (e.g., keyboard, mouse, touch screen, etc.) and display FIG. 470. A program storage device (PSD) FIG. 480 (sometimes referred to as a hard disc)

is included with the system unit FIG. 410. Also included with system unit FIG. 410 is a network interface FIG. 440 for communication via a network with other computing and corporate infrastructure devices (not shown). Network interface FIG. 440 may be included within system unit FIG. 410 or be external to system unit FIG. 410. In either case, system unit FIG. 410 will be communicatively coupled to network interface FIG. 440. Program storage device FIG. 480 represents any form of non-volatile storage including, but not limited to, all forms of optical and magnetic, including solid-state, storage elements, including removable media, and may be included within system unit FIG. 410 or be external to system unit FIG. 410. Program storage device FIG. 480 may be used for storage of software to control system unit FIG. 410, data for use by the computer FIG. 400, or both.

System unit FIG. 410 may be programmed to perform methods in accordance with this disclosure (an example of which is in FIG. 2). System unit FIG. 410 comprises a processor unit (PU) FIG. 420, input-output (I/O) interface FIG. 450 and memory FIG. 430. Processing unit FIG. 420 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory FIG. 430 may include one or more memory modules and comprise random access memory (RAM), read only memory (ROM), programmable read only memory (PROM), programmable read-write memory, and solid-state memory. One of ordinary skill in the art will also recognize that PU FIG. 420 may also include some internal memory including, for example, cache memory.

Figure 5:
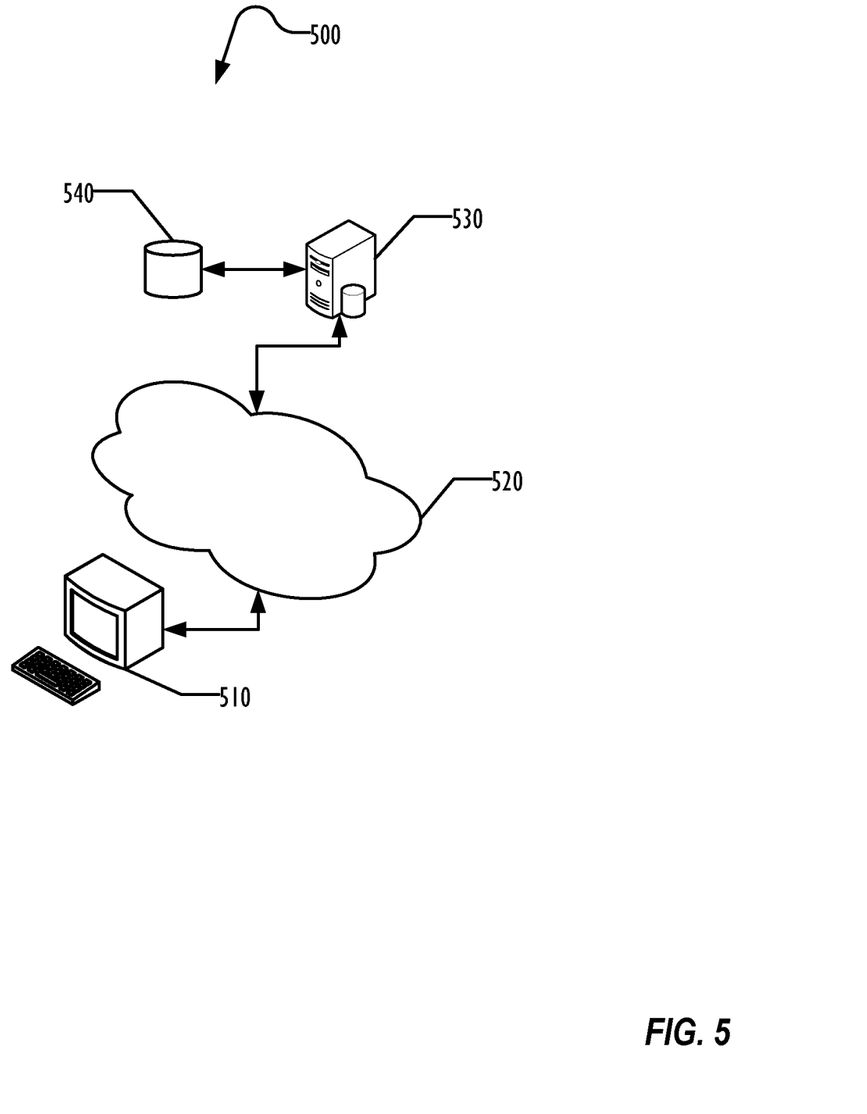
FIG. 5 illustrates, in block diagram form, a network of computers and servers in which the techniques described above may execute and be stored according to one embodiment.

In one embodiment, illustrated in FIG. 5, the application may run in a JVM on one computer 510. The application may be loaded from the computer 510 or may be loaded from a storage system 540 controlled by a file server 530. Similarly, the hooking code performing the techniques described above may be loaded from the computer 510 or may be loaded from a storage system 540 controlled by the file server 530. The computer 510 may be connected to the file server 530 by one or more networks 520.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
including a first class in a classpath of a first class loader, the first class including a first main method and hook code;
loading, by the first class loader, the first class in an object-oriented environment executing on a computer;
executing, by the first main method, the hook code, the executing of the hook code performing the operations of:
instantiating a second class loader;
including a second class in a classpath of the second class loader, the second class including a second main method; and
manipulating the object-oriented environment to use the second class loader instead of the first class loader when loading classes into the object-oriented environment, and to make the first class invisible to the second class by excluding the first class from the classpath of the second class loader;
loading the second class in the object-oriented environment by the second class loader; and
executing the second main method on the computer in the object-oriented environment.

2. The method of claim 1, further comprising:
instrumenting the second class by the first class.

3. The method of claim 1, further comprising:
performing a first action by the first main method prior to loading the second class in the object-oriented environment.

4. The method of claim 1, wherein the second class has a name identical to a name of the first class.

5. The method of claim 1, wherein loading the first class in an object-oriented environment executing on a computer comprises:
loading the first class by a class loader method of a first instance of a launcher class, and wherein manipulating the object-oriented environment to make the first class invisible to the second class further comprises:
instantiating a second instance of the launcher class; and
manipulating the object-oriented environment to use a class loader method of the second instance of the launcher class instead of the class loader method of the first instance of the launcher class when loading classes into the object-oriented environment.

6. The method of claim 1, wherein loading the first class in an object-oriented environment executing on a computer comprises:
instantiating a first instance of a launcher class, wherein the launcher class defines the first class loader and a third class loader; and
defining the first class loader as a parent of the third class loader.

7. The method of claim 6, wherein loading the first class in an object-oriented environment executing on a computer comprises further comprises:
storing the first class in a first storage location inaccessible to the third class loader; and
storing the second class in a second storage location inaccessible to the first class loader.

8. The method of claim 1, wherein the first class is inaccessible to the second class loader.

9. The method of claim 1, further comprising:
instantiating a first launcher class that includes the first class loader; and
instantiating a second launcher class that includes the second class loader.

10. The method of claim 9, wherein manipulating the object-oriented environment to make the first class invisible to the second class comprises:
making the first class inaccessible to the second launcher class.

11. The method of claim 1, wherein manipulating the object-oriented environment to use the second class loader instead of the first class loader comprises updating the object oriented environment.

12. The method of claim 1, wherein manipulating the object-oriented environment to make the first class invisible to the second class comprises:
   removing a path to the first class from a property of the object-oriented environment.

13. The method of claim 1,
   wherein loading the first class in an object-oriented environment executing on a computer comprises:
      instantiating a first launcher class including the first class loader and a third class loader;
      delegating a request to load the first class from the third class loader to the first class loader; and
      setting a property of the object-oriented environment used by the first class loader to refer to a storage location associated with the first class; and
   wherein manipulating the object-oriented environment to make the first class invisible to the second class comprises:
      instantiating a second launcher class including the second class loader;
      delegating a request to load the second class to the second class loader if the second class is accessible to the second class loader; and
      making the first class inaccessible to the second class loader.

14. The method of claim 13, wherein the making the first class inaccessible to the second class loader comprises:
   setting a property of the object-oriented environment used by the second class loader to exclude a storage location associated with the first class.

15. The method of claim 13, wherein the second launcher class includes a fourth class loader, and wherein manipulating the object-oriented environment to make the first class invisible to the second class further comprises:
   updating the object-oriented environment to use the second class loader and the fourth class loader instead of the first class loader and the third class loader.

16. The method of claim 13, wherein the second launcher class includes a fourth class loader, and wherein manipulating the object-oriented environment to make the first class invisible to the second class further comprises:
   loading the second class in the object-oriented environment by the fourth class loader.

17. The method of claim 13, wherein manipulating the object-oriented environment to make the first class invisible to the second class further comprises:
   loading the first class by the first class loader.

18. A non-transitory computer readable medium with instructions for a programmable control device stored thereon wherein the instructions cause the programmable control device to perform the method of claim 1.

19. A networked computer system comprising:
   a first computer system comprising:
      a first processor;
      a first software, which when executed creates an object-oriented environment on the first processor; and
      a second software, which when executed causes the object-oriented environment to:
         include a first class in a classpath of a first class loader, the first class including a main method and hook code;
         load, by the first class loader, the first class into the object-oriented environment, wherein the first class includes logic to allow the main method to execute the hook code, the executing of the hook code performing operations to:
         instantiate a second class loader;
         include a second class in a classpath of the second class loader, the second class including a second main method; and
         manipulate the object-oriented environment to use the second class loader instead of the first class loader when loading classes into the object-oriented environment, and to make the first class invisible to the second class by excluding the first class from the classpath of the second class loader; and
      load the second class in the object-oriented environment by the second class loader; and
   a second computer system, communicatively coupled to the first computer system, comprising:
      a second processor; and
      a storage subsystem on which is stored the first class.

* * * * *

UNITED STATES PATENT AND TRADEMARK OFFICE
CERTIFICATE OF CORRECTION

| | | |
|---|---|---|
| PATENT NO. | : 8,745,598 B2 | Page 1 of 1 |
| APPLICATION NO. | : 12/967211 | |
| DATED | : June 3, 2014 | |
| INVENTOR(S) | : Koren et al. | |

It is certified that error appears in the above-identified patent and that said Letters Patent is hereby corrected as shown below:

On the Title page, in Item [75], in column 1, line 1, delete "Kibbuta" and insert -- Kibbutz --, therefor.

In the Claims

Column 8, line 47, Claim 7, delete "comprises further comprises:" and insert -- comprises: --, therefor.

Signed and Sealed this
Twelfth Day of August, 2014

Michelle K. Lee
*Deputy Director of the United States Patent and Trademark Office*